June 27, 1944.  R. L. BRIGGS, JR  2,352,249
VALVE
Filed Feb. 1, 1941
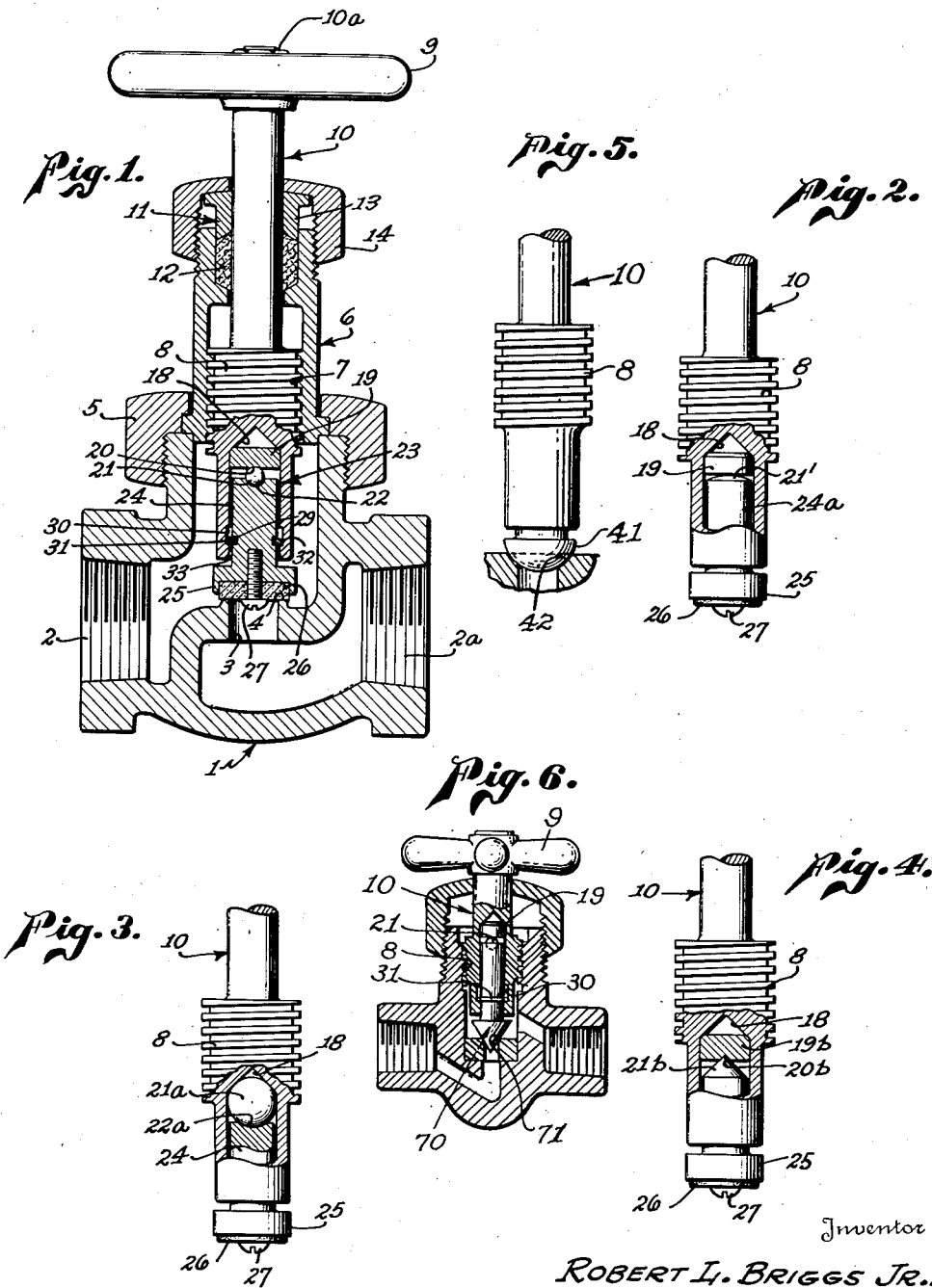
Inventor
ROBERT L. BRIGGS JR.,
By Robert A. Huebner
Attorney Patented June 27, 1944

2,352,249

UNITED STATES PATENT OFFICE 2,352,249

VALVE

Robert L. Briggs, Jr., Pasadena, Calif.

Application February 1, 1941, Serial No. 377,023

9 Claims. (Cl. 251—46)

My invention relates to valves and is particularly directed to improvements in globe type compression valves, needle valves, ground ball valves and the like which are suitable for service on hydraulic lines carrying steam, water, oil, gas or other fluid.

My invention more particularly relates to a novel valve stem and swivel, disc or other closure member which can be combined with any standard or conventional valve assembly, for the purpose of enabling the swivel, disc, or other closure member to be advanced under pressure for seating with a minimum of rotational stress between the closure member and the seat.

Valves embodying my invention are suitable for low, moderate and high pressure service, depending primarily upon the type of disc or other closure member and seat. The size, weight, strength and arrangement of the various parts comprising my invention and the materials utilized therefor, may be changed to suit different conditions and requirements.

It is a general object of my invention to provide improvements in a device of the character described in which is combined a wide range of utility, with simple construction and moderate cost of production.

Another object of my invention is to provide a device of the character described incorporating a type of construction which is relatively light in weight, for the purposes for which it is designed, compact and neat in appearance and relatively simple to assemble.

A further more specific object of my invention is to provide for incorporation in a valve assembly a valve stem which is partially hollow, with a swivel, disc or other closure member rotatably mounted therein, designed to operate freely and to withstand the torsional and tensile stresses and strains to which valves of the character indicated are subjected, and to provide a high resistance to wear and fracture or breakage of the valves and their component parts.

A further specific object of my invention is to provide in a valve assembly of the character described a swivelled closure member adapted to be advanced under pressure for seating with a minimum of rotational stress between the closure member and the seat. An important principle utilized in this connection, is a bearing between the valve stem and swivel member of the closure member having a small area of contact with a high resistance value. For this purpose the bearing engagement should be between relatively hard metals, which is possible in my invention irrespective of the material which is used in the valve proper.

My valve possesses a high factor of safety against pressure operating strains and displacement. It will be found that in use valves which embody my invention close easily, seat perfectly tight, and withstand wear exceptionally well.

The stem of any standard valve of the types mentioned can be altered according to my invention, and the necessary parts installed, without otherwise changing the valve assembly. I may supply the stem and swivelled closure member according to my invention as a unit for replacement of the conventional stem and disc, although I prefer to produce the whole valve in order to obtain the benefit of relative proportions of parts which I have found most desirable, particularly an increase over standard in the diameter of the stem.

A still further object of my invention is to enable the use of relatively soft materials for the body, stem and swivel member of the valve, employing relatively hard materials only for the thrust bearing, which may include a ball and a disc or hardened surface at the upper end of a bore in the stem. Thus, the invention is particularly well adapted to the use of a plastic for the body, stem and swivel member, and either a harder plastic or metal, having sufficient hardness to support the stress and furnish a smoothly operating bearing, for the thrust bearing.

Other objects and advantages will become apparent from a further description of my invention and reference to the accompanying drawing.

In the drawing:

Figure 1 is a vertical cross-sectional view of a complete valve assembly embodying the preferred form of my invention.

Figure 2 is a fragmentary elevation, partly in cross-section, showing a modified form of bearing.

Figure 3 is a fragmentary elevation, partly in cross-section, of another modified form of bearing.

Figure 4 is a fragmentary elevation, partly in cross-section, of another modified form of bearing.

Figure 5 is a fragmentary elevation illustrating my invention applied to a globe type ground ball valve.

Figure 6 is a vertical cross-section of a complete valve assembly employing my invention in a needle valve.

Referring to Figure 1, the device illustrative of the preferred form of my invention comprises a valve body 1, having chambers 2 and 2a and a bore 3 communicating between the chambers and providing a valve seat 4. The upper portion of the body is externally threaded as shown for engagement with an internally threaded bonnet ring 5, which secures a bonnet 6 to the valve body. The bonnet is formed with internal threads 7 and is adapted to receive a valve stem 10 which is externally threaded at 8 for engagement with the bonnet threads 7. The shank of the valve stem is adapted to carry a wheel 9 which is secured thereto by a wheel nut 10a. In place of the wheel any standard type of handle or lever may be used with which to turn or rotate the valve stem. Within the upper portion of the bonnet is a stuffing box 11 providing for packing 12 compressible by gland 13 under the influence of a packing nut 14.

With the exception of the valve stem 10, the parts just described are conventional, and all essential details are known to any one skilled in the art and are apparent in the drawing.

The lower portion of the valve stem is hollow to a point extending just above the lower convolution of the external threads on the stem, forming a cylinder. The upper end of the cylinder is preferably tapered as at 18 and is adapted to receive a removable annular bearing member 19, the upper edge of which is slightly bevelled to insure correct positioning of the bearing member in the upper end of the cylinder as shown.

This bearing member should be made of hard metal or alloy such for example as stainless steel preferably having a minimum of 180 Brinell hardness. In the lower surface of the bearing member is a shallow spherical depression 20 adapted to accommodate a ball 21. The ball 21 is driven or pressed firmly into a recess 22 in the upper end of a swivel member 23. The ball should of course be of hard metal.

The swivel member comprises a spindle 24 at the lower end of which is a flange or disc 25. The flange is hollowed out to form a cup in which is seated a standard faucet washer 26 which is held in place by a screw 27 cooperating with internal threads in the lower part of the swivel member. Any type of standard or conventional washer made of rubber or composition may be used. It would be an equivalent to dispense with a washer altogether and to use a flat bottomed flange or disc or one of tapered, pig-nosed or other shape, so long as it is designed to cooperate with the valve seat 4. The spindle 24 of the swivel member is of slightly less diameter than the cylindrical bore of the valve stem for free rotation therein. There should be sufficient play so that the flange or disc 25 may be advanced against the valve seat 4 without any binding between the spindle and the bore of the valve stem.

For retaining the swivel member within the stem I form the swivel member with a lock spring groove 29, and provide a complementary, somewhat longer groove 30 in the bore of the stem. A split lock spring 31 is installed in the groove 29, and is adapted to engage the shoulder 32 at the lower end of the groove 30 to prevent the swivel member from dropping out of the valve stem. If a round wire spring is used, the swivel member may be removed when desired by spreading the flange and the lower end of the stem by a screw driver. The groove 29 should be made deep enough to receive the spring when compressed for this purpose.

The groove 30 is made longer than the groove 29 to compensate for wear or compression which may occur at the bearing, and to prevent the spring from wedging or freezing between the stem and swivel member, or usurping in any way the function of the bearing. There also should be sufficient lateral play between the spring and the valve stem so there is absolute freedom of rotary movement between the stem and swivel member.

My novel valve stem and swivel member are assembled as a unit before being installed in the valve. The bearing member 19 is inserted in the cylinder or bore of the stem. The fit between the bearing member 19 and the bore of the stem should either provide sufficient clearance for escape of air pocketed above the bearing member, or this member be formed with a vertical groove or port for that purpose. The ball 21 is driven into the upper end of the spindle 24, and the spring 31 is snapped into the groove 29. The spindle is then inserted in the bore of the stem, and sufficient force applied to compress the spring so that the spindle will travel in until the spring expands loosely into the groove 30. Compression of the spring is facilitated by having the mouth of the bore chamfered as indicated at 33. The stem and swivel member unit is then assembled with the conventional parts of the valve in a manner readily understood by reference to the drawing.

The operation of the valve assembly which I have described and which incorporates my invention, is as follows:

Assuming that the disc 25 is raised from the valve seat 4, the valve is closed by turning the wheel 9, which causes the threads 8 on the valve stem to cooperate with the threads 7 on the bonnet and advance the valve stem downwardly. This forces the washer on the spindle 24 firmly against the valve seat. If a tapered or pig-nosed closure member and valve seat are used the advancing of the stem will wedge the closure member into its seat so as to provide a seal. To open the valve the wheel is turned in the reverse direction and the stem is drawn upward so that the washer or closure member is raised from the seat to open the bore 3, and thereby permits the flow of fluid through the chambers 2 and 2a.

There is a minimum of rotational stress or shearing action between the closure member and the valve seat, and instead a direct longitudinal pressure engagement, which prolongs the life of the closure member and seat, and insures a more effective seal at all times. By reason of the freedom of play between the spindle and bore of the stem, and the single, relatively small bearing point, the closure member is permitted to seat naturally, and complete contact is assured, even if its final position is somewhat distorted by reason of wear or misalignment.

Figure 2 illustrates a modified form of bearing. The construction is generally the same as the device illustrated in Figure 1 except for the fact that the ball 21 (Fig. 1) is omitted, and I substitute a convex head 21' formed on the spindle 24a to bear against the lower surface of the bearing member 19. The convex bearing surface 21' should be of hard material. To accomplish this I may either employ a complete spindle having the required hardness, or I may harden the extreme end, or as an alternative may cap the end with a convex disc having the required hardness. In this form the lower end of the bearing member 19 may be flat.

Figure 3 illustrates another modified form of swivel member bearing. In this form the bearing member 19 of Figure 1 is omitted and a large ball 21a is fixed in the upper end of the spindle bore. A bearing depression or cup 22a is formed in the upper end surface of the spindle 24 to serve as a bearing for the ball. This bearing surface should be hard, and can be provided in any one of the three ways suggested in connection with the disclosure of Figure 2.

Figure 4 illustrates another modified form of bearing, in which the head of the spindle is tapered or pointed as at 21b and designed to seat in a conical depression or cup 20b formed in the lower end surface of the bearing member 19b. The pointed end of the spindle is of hard material, as in the case of the forms shown in Figures 2 and 3.

Figure 5 illustrates my invention applied to a modified type of valve utilizing a swivel member mounted in the valve stem according to any of the preceding figures. The lower end or disc portion of the swivel member is rounded as at 41 so as to form what is generally termed a ground ball valve. The ball seats in a cup or ground seat 42 of standard design so as to form a metal to metal seal against the flow of fluid through the valve body. Otherwise the construction, function and operation of this structure is substantially the same as in the device illustrated in Figure 1.

Figure 6 illustrates another modified form embodying my invention, and shows in vertical cross-section a complete valve assembly. The novel feature of this construction is the use of a needle point valve 70 instead of the types shown in preceding structures and figures. The swivel member holding the needle valve is constructed and mounted substantially as in Figure 1. The seat 71 for the needle point valve 60 is of any suitable type or design.

All bearings, bearing surfaces and balls or rollers should be made of suitable hard metals or alloys or other hard material in order to withstand the stresses and strains to which they are subjected, and to attain one of the principal advantages of the invention which is the application of swivel member bearings with a small area of bearing contact and high resistance value. With this requirement met, the balance of the valve may be made of any suitable material which need not be of the same hardness.

I claim as my invention:

1. A valve comprising a body having fluid chambers, a passage between the chambers, and a valve seat in the passage, a valve stem having a cylindrical bore and threadedly supported in connection with the body to advance and retract toward and from the seat, a swivel member rotatably mounted within the bore of the stem and carrying an element at its lower end for closing engagement with the seat, and a thrust bearing at the upper end of the swivel member comprising a ball rigidly fixed in the upper end of the swivel member, and a complementary bearing member positioned in the bore of the valve stem at the upper end thereof for engagement with the ball, the ball and the bearing member being made of a relatively hard material.

2. A device of the character described in claim 1 in which there is a spherical recess in the bearing surface of the bearing member to accommodate the ball.

3. A valve comprising a body having fluid chambers, a passage between the chambers, and a valve seat in the passage, a valve stem having a cylindrical bore and threadedly supported in connection with the body to advance and retract toward and from the seat, a swivel member rotatably mounted within the bore of the stem and carrying an element at its lower end for closing engagement with the seat, and a thrust bearing at the upper end of the swivel member comprising a ball rigidly fixed in the upper end of the swivel member, and a complementary bearing member positioned in the bore of the valve stem at the upper end thereof for engagement with the ball, the ball and the bearing member having a minimum hardness of 180 Brinell.

4. A valve comprising a body having fluid chambers, a passage between the chambers, and a valve seat in the passage, a valve stem having a cylindrical bore and threadedly supported in connection with the body to advance and retract toward and from the seat, a swivel member rotatably mounted within the bore of the stem and carrying an element at its lower end for closing engagement with the seat, a thrust bearing at the upper end of the swivel member, and means for retaining the swivel member in the hollow portion of the valve stem with limited sliding movement, said means including a groove in the swivel member, a split expansion spring ring in the groove, and a complementary elongated groove in the bore of the valve stem providing a shoulder adapted to be engaged by the ring.

5. A valve comprising a body having fluid chambers, a passage between the chambers, and a valve seat in the passage, a valve stem having a cylindrical bore and threadedly supported in connection with the body to advance and retract toward and from the seat, a swivel member rotatably mounted within the bore of the stem and carrying an element at its lower end for closing engagement with the seat, a thrust bearing at the upper end of the swivel member, and means for retaining the swivel member in the hollow portion of the valve stem, said means including a groove in the swivel member, a split expansion spring ring in the groove, and a complementary groove in the bore of the valve stem providing a shoulder adapted to be engaged by the ring, the groove in the bore of the valve stem being substantially longer than the diameter of the split ring to compensate for longitudinal displacement of the swivel member.

6. A valve comprising a body having fluid chambers, a passage between the chambers, and a valve seat in the passage, a valve stem having a cylindrical bore and threadedly supported in connection with the body to advance and retract toward and from the seat, a swivel member rotatably mounted within the bore of the stem and carrying an element at its lower end for closing engagement with the seat, a thrust bearing at the upper end of the swivel member, and means for retaining the swivel member in the hollow portion of the valve stem, said means including a groove in the swivel member, a split expansion spring ring in the groove, and a complementary groove in the bore of the valve stem providing a shoulder adapted to be engaged by the ring, the hollow portion of the valve stem being chamfered at the lower end to facilitate compression and introduction of the split ring.

7. A valve comprising a body having fluid chambers, a passage between the chambers, and a valve seat in the passage, a valve stem having a cylindrical bore and threadedly supported in connection with the body to advance and retract toward and from the seat, a swivel member rotatably mounted within the bore of the stem and carrying an element at its lower end for closing engagement with the seat, a thrust bearing at the upper end of the swivel member, and means for retaining the swivel member in the hollow portion of the valve stem, said means including a groove in the swivel member, a split expansion spring ring in the groove, and a complementary groove in the bore of the valve stem providing a shoulder adapted to be engaged by the ring, the said ring being round to enable it to be contracted for withdrawal of the swivel member from the hollow valve stem when opposing pressure is applied between the lower end of the valve stem and the swivel member, and the groove in the swivel member being of sufficient depth to permit contraction of the said ring for the purpose stated.

8. A valve comprising a body having fluid chambers, a passage between the chambers, and a valve seat in the passage, a valve stem having a cylindrical bore and threadedly supported in connection with the body to advance and retract toward and from the seat, a swivel member rotatably mounted within the bore of the stem and carrying an element at its lower end for closing engagement with the seat, means for retaining the swivel member in the hollow portion of the valve stem, and a thrust bearing at the upper end of the swivel member comprising a ball non-rotatably fixed in the upper end of the swivel member, and a removable hard disc positioned in the bore of the valve stem at the upper end thereof for engagement with the ball.

9. A valve comprising a body having fluid chambers, a passage between the chambers, and a valve seat in the passage, a valve stem having a cylindrical bore and threadedly supported in connection with the body to advance and retract toward and from the seat, a swivel member rotatably mounted within the bore of the stem and carrying an element at its lower end for closing engagement with the seat, means for retaining the swivel member in the hollow portion of the valve stem, and a thrust bearing at the upper end of the swivel member comprising a ball rigidly fixed in the upper end of the swivel member, and a removable hard disc positioned in the bore of the valve stem at the upper end thereof for engagement with the ball, said ball having a small diameter relative to the diameter of said swivel member.

ROBERT L. BRIGGS, Jr.